(12) United States Patent
Kim

(10) Patent No.: US 11,465,038 B2
(45) Date of Patent: Oct. 11, 2022

(54) METHOD OF PUZZLE GAME AND GAME SYSTEM USING THE METHOD

(71) Applicants: NHN Entertainment Corporation, Seongnam-si (KR); NHN PixelCube Corporation, Seongnam-si (KR)

(72) Inventor: Seong Hyeon Kim, Seongnam-si (KR)

(73) Assignees: NHN Entertainment Corporation, Seongnam-si (KR); NHN PixelCube Corporation, Seongnam-si (KR)

( * ) Notice: Subject to any disclaimer, the term of this patent is extended or adjusted under 35 U.S.C. 154(b) by 376 days.

(21) Appl. No.: 15/697,138

(22) Filed: Sep. 6, 2017

(65) Prior Publication Data

US 2018/0071618 A1    Mar. 15, 2018

(30) Foreign Application Priority Data

Sep. 9, 2016 (KR) .................... 10-2016-0116121

(51) Int. Cl.
*A63F 9/06* (2006.01)
*A63F 13/30* (2014.01)
(Continued)

(52) U.S. Cl.
CPC ............ *A63F 9/0612* (2013.01); *A63F 13/30* (2014.09); *A63F 13/73* (2014.09); *A63F 13/80* (2014.09);
(Continued)

(58) Field of Classification Search
CPC ...... A63F 9/1612; A63F 13/80; A63F 13/847; A63F 13/92; A63F 13/73; A63F 13/30; G06F 3/04842
See application file for complete search history.

(56) References Cited

U.S. PATENT DOCUMENTS

2006/0252478 A1* 11/2006 Eto .................. A63F 13/10
463/9
2010/0160038 A1* 6/2010 Youm ................ A63F 13/497
463/29

(Continued)

FOREIGN PATENT DOCUMENTS

JP    2015-054220    3/2015
JP    2015-070951    4/2015

(Continued)

OTHER PUBLICATIONS

Office Action dated Feb. 9, 2021, issued in Japanese Patent Application No. 2017-173501.

(Continued)

*Primary Examiner* — Thomas H Henry
(74) *Attorney, Agent, or Firm* — H.C. Park & Associates, PLC

(57) ABSTRACT

A method for providing a puzzle game performed by a game server connected to a user terminal via a network includes the steps of: performing a user login process in response to receiving login information from the user terminal; and executing the puzzle game on the user terminal in response to receiving a game execution signal from the user terminal. Game action is performed in conjunction with player object groups if it is determined that a puzzle block elimination condition is satisfied according to a cumulative result of eliminating the puzzle blocks.

39 Claims, 11 Drawing Sheets

(51) Int. Cl.
*A63F 13/73* (2014.01)
*G06F 3/0484* (2022.01)
*A63F 13/80* (2014.01)
*A63F 13/92* (2014.01)
*A63F 13/847* (2014.01)
*G06F 3/04842* (2022.01)

(52) U.S. Cl.
CPC ............ *A63F 13/847* (2014.09); *A63F 13/92* (2014.09); *G06F 3/04842* (2013.01)

(56) References Cited

U.S. PATENT DOCUMENTS

| | | | | |
|---|---|---|---|---|
| 2013/0331162 | A1* | 12/2013 | Krivicich | ............ G06F 3/04812 463/10 |
| 2014/0080560 | A1* | 3/2014 | Knutsson | ................ G07F 17/32 463/10 |
| 2014/0370984 | A1 | 12/2014 | Beppu | |
| 2015/0174488 | A1* | 6/2015 | Dancau | ................... A63F 13/57 463/9 |

FOREIGN PATENT DOCUMENTS

| | | |
|---|---|---|
| JP | 2016-007530 | 1/2016 |
| JP | 2016-036572 | 3/2016 |
| KR | 10-2015-0138414 | 12/2015 |

OTHER PUBLICATIONS

Baka and Test: Summon the Beast for Mixi, Weekly Famitsu, Apr. 8, 2010, pp. 80-81, vol. 25, No. 16, Enterbrain Inc., Tokyo, Japan.

* cited by examiner

METHOD OF PUZZLE GAME AND GAME SYSTEM USING THE METHOD

CROSS REFERENCE TO RELATED APPLICATIONS

This application claims priority from and the benefit of Korean Patent Application No. 10-2016-0116121, filed on Sep. 9, 2016, which is hereby incorporated by reference for all purposes as if fully set forth herein.

BACKGROUND

Field

Exemplary embodiments of the present invention relate to a method for providing a puzzle game and a game system using the method. More particularly, the exemplary embodiment relate to a method for providing a puzzle game eliminating a plurality of puzzle blocks having the same color and a game system using the same.

Discussion of the Background

Recently, various kinds of games provided in the form of apps for a smartphone are being developed. One of such games is a puzzle game that progresses while eliminating three or more puzzle blocks having the same color.

A brief description of the currently serviced puzzle game method is as follows. First, when puzzle blocks, each of which has any one of a plurality of colors, are displayed on a smartphone, a user exchanges one of the puzzle blocks with a neighboring puzzle block through a touch input. At this time, if it is determined that three or more puzzle blocks having the same color in at least one direction are arranged according to the exchange of the puzzle blocks, the three or more puzzle blocks are eliminated and a predetermined score is acquired.

However, because such a conventional block game has a simple progress method in which the puzzle blocks are eliminated and scores are obtained by merely exchanging the puzzle blocks, users may easily lose interest and stop having fun, resulting in reduced loyalty of users.

The above information disclosed in this Background section is only for enhancement of understanding of the background of the inventive concepts, and, therefore, it may contain information that does not form the prior art that is already known in this country to a person of ordinary skill in the art.

SUMMARY

Exemplary embodiments of the present invention provide a game system including a game server and a user terminal.

Additional features of the invention will be set forth in the description which follows, and in part will be apparent from the description, or may be learned by practice of the invention.

An exemplary embodiment of the present invention discloses a method for providing a puzzle game performed by a user terminal connected to a game server via a network and including display unit displaying an image, the method including steps of: configuring a player object group including at least one player object having a unique color; and performing a turn of the puzzle game. The step of performing a turn of the puzzle game includes: displaying a current player object to be applied to a current turn from the player object group; receiving a user selection of one of the displayed puzzle blocks; changing a first color of the blocks to a second color of the current player object; determining whether a number of puzzle blocks adjacent to each other equal to or more than N, where N is a integer equal to or greater than 3, have the same color so as to form "matching puzzle blocks"; and eliminating the matching puzzle blocks.

The step of performing a turn of the puzzle game may further include steps of: moving puzzle blocks remaining after eliminating the matching puzzle blocks from one side to another side to fill spaces where the matching puzzle blocks have been eliminated; and repeating the steps of determining, eliminating, and moving until it is determined no more matching puzzle blocks exists.

Further, the step of performing a turn of the puzzle game may include steps of: charging an activation gauge of the current player object according to a result of eliminating the matching puzzle block; and performing an individual skill of the current player object when the activation gauge of the current player object reaches a reference value.

The step of performing a turn of the puzzle game may further include a step of: performing a group skill when two or more player objects among a plurality of player objects included in the player object group have the same group skill.

Further, the method may further include a step of: displaying the puzzle blocks in response to a user input of entering a game stage, wherein the turn of the puzzle game is performed in the game stage.

According to an exemplary embodiment, the puzzle blocks in the game stage may be displayed in a play region of the display unit, and the current player object may be displayed in a peripheral region of the display unit.

The current player object may be randomly determined among a plurality of player objects included in the player object group. Also, at least one waiting player object which is to be applied in a turn after current turn may be displayed in the peripheral region.

The waiting player object may be randomly determined among a plurality of player objects included in the player object group. The waiting player object may include a next player object that is to be applied to a next turn of the current turn and a post-next player object that is to be applied to a turn after the next turn.

The current player object may have two or more colors, the current player object is displayed in one of the two or more colors in the peripheral region.

According to an embodiment, the method may further include steps of: decrementing number of remaining turns in the game stage after performing the turn of the puzzle game; and performing the turn of the game until the number of remaining turns in the game stage becomes zero.

Further, the method may further include a step of repeating the step of performing a turn until an acquired score in the game stage reaches a target score.

Also, the step of performing a turn of the puzzle game may further include a step of generating a special block in one of the spaces where the matching puzzle blocks have been eliminated when a number of puzzle blocks eliminated is equal to or greater than M, where M is an integer larger than N. In this case, when a special block is selected by the user input, or included in the matching puzzle block, a special skill of the special block may be performed.

An exemplary embodiment of the present invention also discloses a method for providing a puzzle game performed by a game server connected via a network to a user terminal including display unit displaying an image, the method comprising steps of: configuring a player object group including at least one player object having a unique color; and performing a turn of the puzzle game. The step of performing a turn of the puzzle game includes: displaying a current player object to be applied to the current turn from the player object group; displaying a set of puzzle blocks having predetermined colors; receiving a user selection of one of the displayed puzzle blocks; changing displayed first color of the selected puzzle blocks a second color of the current player object; determining whether a number of puzzle blocks adjacent to each other equal to or more than N, where N is a integer equal to or greater than 3, have the same color so as to form matching puzzle blocks; and eliminating the matching puzzle blocks.

An exemplary embodiment of the present invention also discloses a game server including: a memory connected to a processor for executing stored instruction to provide: a main control unit receiving login information from a user terminal connected via a network to perform a login process; a game processing unit allowing the user terminal to execute the puzzle game in response to receiving a request for puzzle game from the user terminal; and a player object managing unit configuring a player object group including at least one player object, each of which has a color. The game processing unit performs a process for a turn of the puzzle game: receiving a user selection of one of the displayed puzzle blocks; changing displayed first color of the selected puzzle blocks to a second color of the current player object; determining whether a number of puzzle block adjacent to each other equal to or more than N, where N is a integer equal to or greater than 3, have the same color so as to form matching puzzle blocks; and eliminating the matching puzzle blocks.

The foregoing general description and the following detailed description are exemplary and explanatory and are intended to provide further explanation of the claimed subject matter.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
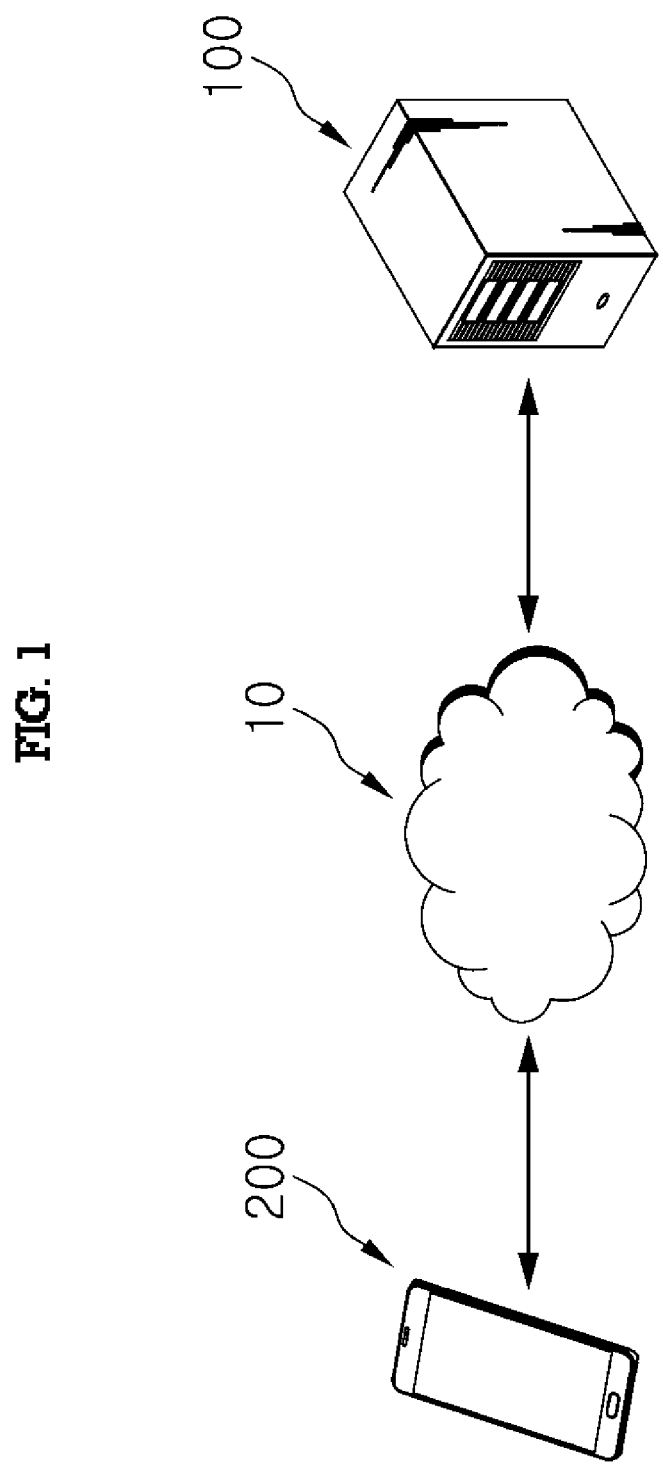
FIG. 1 is a conceptual diagram illustrating a network connection relationship of a game system according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

Unless otherwise specified, the illustrated exemplary embodiments are to be understood as providing exemplary features of varying detail of various exemplary embodiments. Therefore, unless otherwise specified, the features, components, modules, layers, films, panels, regions, and/or aspects of the various illustrations may be otherwise combined, separated, interchanged, and/or rearranged without departing from the disclosed exemplary embodiments. Further, in the accompanying figures, the size and relative sizes of layers, films, panels, regions, etc., may be exaggerated for clarity and descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. Further, the x-axis, the y-axis, and the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein In the accompanying figures, the size and relative sizes of elements may be exaggerated for clarity and descriptive purposes. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element or layer, there are no intervening elements present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, and/or sections, these elements, components, regions, and/or sections should not be limited by these terms. These terms are used to distinguish one element, component, region, and/or section from another element, component, region, and/or section. Thus, a first element, component, region, and/or section discussed below could be termed a second element, component, region, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
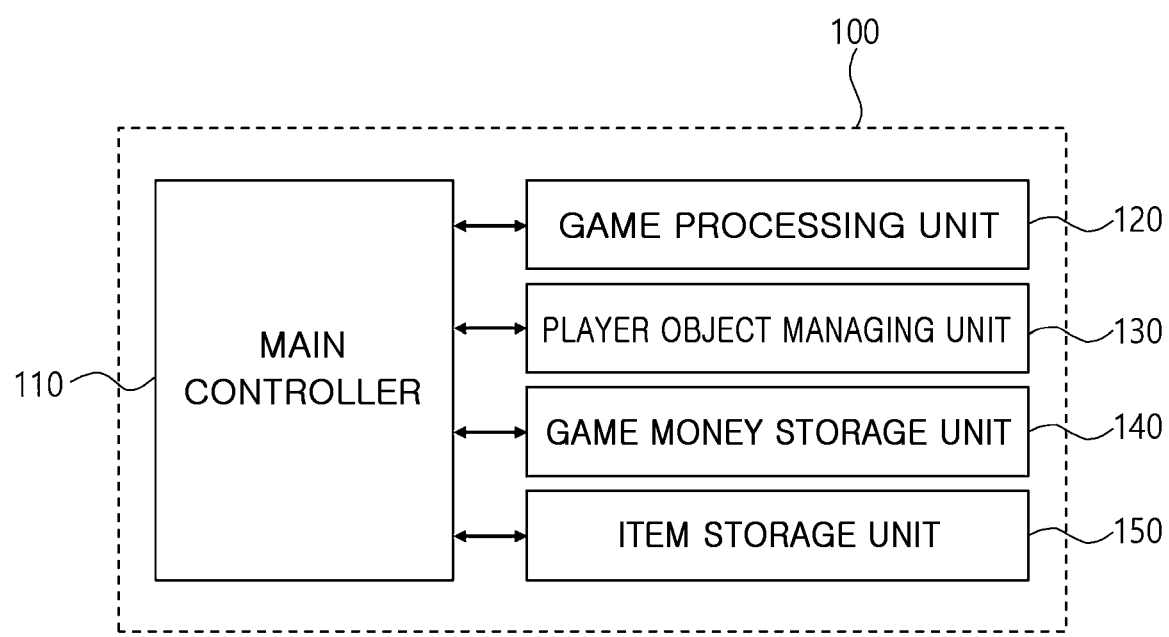
FIG. 2 is a block diagram showing the game server of FIG. 1 in detail.

FIG. 1 is a conceptual diagram illustrating a network connection relationship of a game system according to an exemplary embodiment of the present invention, and FIG. 2 is a block diagram showing the game server of FIG. 1 in detail.

Referring to FIGS. 1 and 2, a game server 100 according to an exemplary embodiment of the present invention, which may be computer system providing a puzzle game for at least one user terminal 200 connected via the network 10, may include a main control unit 110, a game processing unit 120, a player object managing unit 130, a game money storage unit 140, and an item storage unit 150. The user terminal 200 may be a smart device including a smart phone, a tablet PC, and the like capable of running an application program, and displaying various information through the display unit.

In the present exemplary embodiment, the components of the game server 100 may be physically separate computer systems from each other, or functionally separate programs within one computer system. In addition, the components of the game server 100 may be physically or functionally separated programs within a plurality of computer systems.

The main control unit 110 may perform an interface function of connecting to the user terminal 200 through the network 10 to exchange signals with the user terminal 200 and perform user login process in response to receiving login information of the user from the user terminal 200. The user login may be performed in conjunction with an account currently used by the user A, for example, an account of Google®, Facebook®, Naver, and the like.

In addition, the main control unit 110 may be connected to and controls the game processing unit 120, the player object managing unit 130, the game money storage unit 140, and the item storage unit 150 to perform an integrated management of the game.

After the user's login is completed by the main control unit 110, the game processing unit 120 executes the puzzle game on the user terminal 200 in response to receiving the game execution signal from the user terminal 200. For example, the game processing unit 120 may enter the user terminal 200 into a game stage to execute the puzzle game in the game stage.

The player object managing unit 130 provides the user terminal 200 with at least one player object capable of performing certain functions in the puzzle game, and performs management functions such as changing, removing, upgrading the player objects. Here, the player objects that can be provided by the player object managing unit 130 are divided into a plurality of types, and each player object has a unique color. For example, the player object that can be provided by the player object managing unit 130 may be a game character having a figure of a character.

The game money storage unit 140 stores game money of the user A. The game money may be acquired through performing game in a game stage, mission completion, various payment methods, and other methods.

The item storage unit 150 may store various items that may be applied to a game stage. The item may include turn increase item capable of increasing the number of game turns, and a special block generation item capable of generating a special block having a special skill. The item may be acquired according to the game result performed in the game stage, or may be acquired by various payment methods and other methods.

Hereinafter, a process performed by the game server 100 and/or the user terminal 200 will be described in detail.

Figure 3:
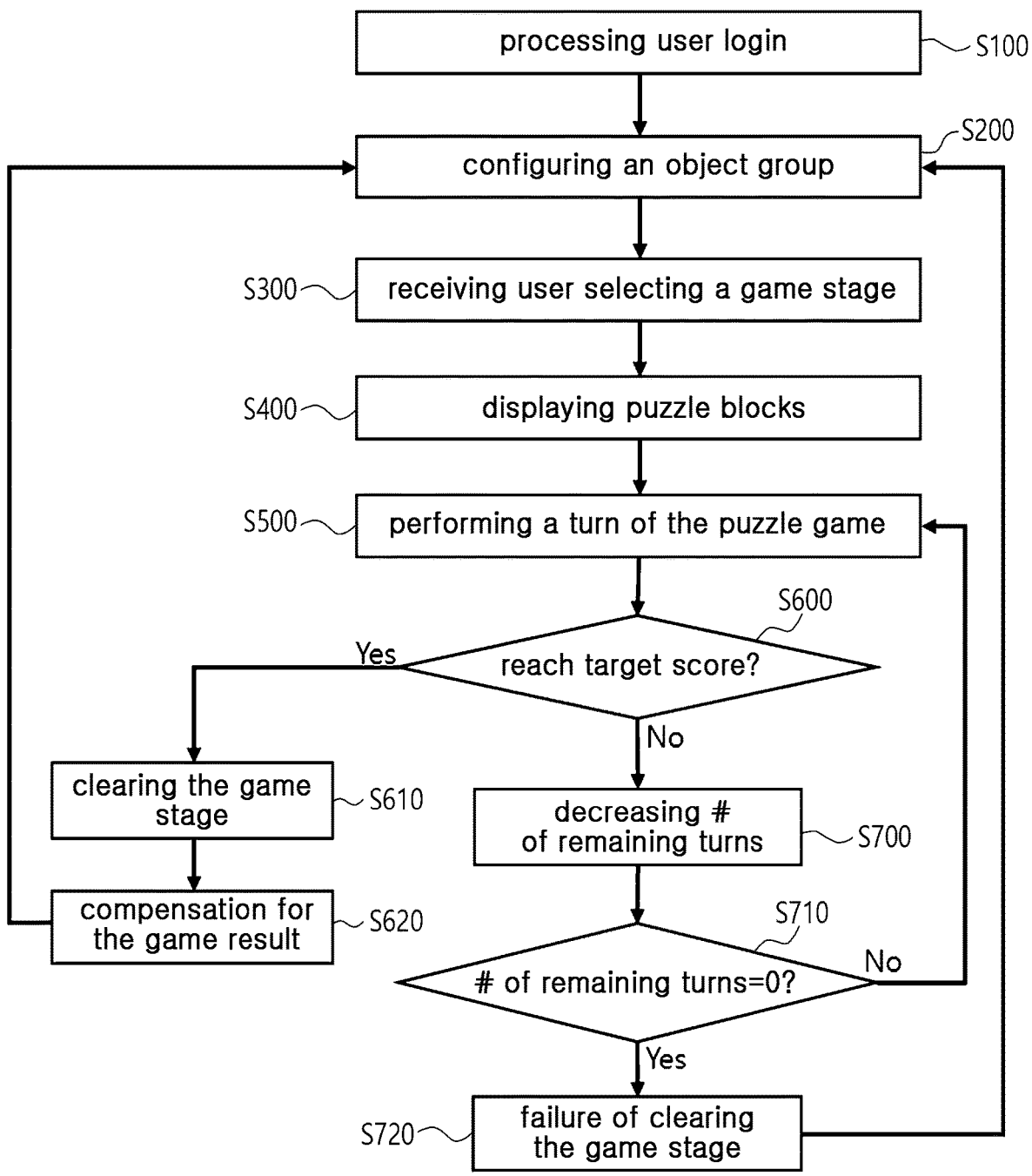
FIG. 3 is a flowchart illustrating an exemplary embodiment of a method for providing a puzzle game performed by the game system of FIG. 1.

FIG. 3 is a flowchart illustrating a puzzle game process performed by the game server of FIG. 1.

Referring to FIG. 3, when the user terminal 200 executes a game program, for example, game application, the user terminal 200 accesses the main control unit 110 of the game server 100 through the network 10 and then the main control unit 110 performs user log-in process in response to receiving the login information of the user A from user terminal 200 (S10). At this time, if the main control unit 110 stores the login information of the user A obtained in previous a login process of the user A, the main control unit 110 may automatically perform the login process without requiring any input information. Meanwhile, the user login may be performed in association with an account currently used by the user A, for example, an account of Google®, Facebook®, Naver, or the like.

Figure 4:
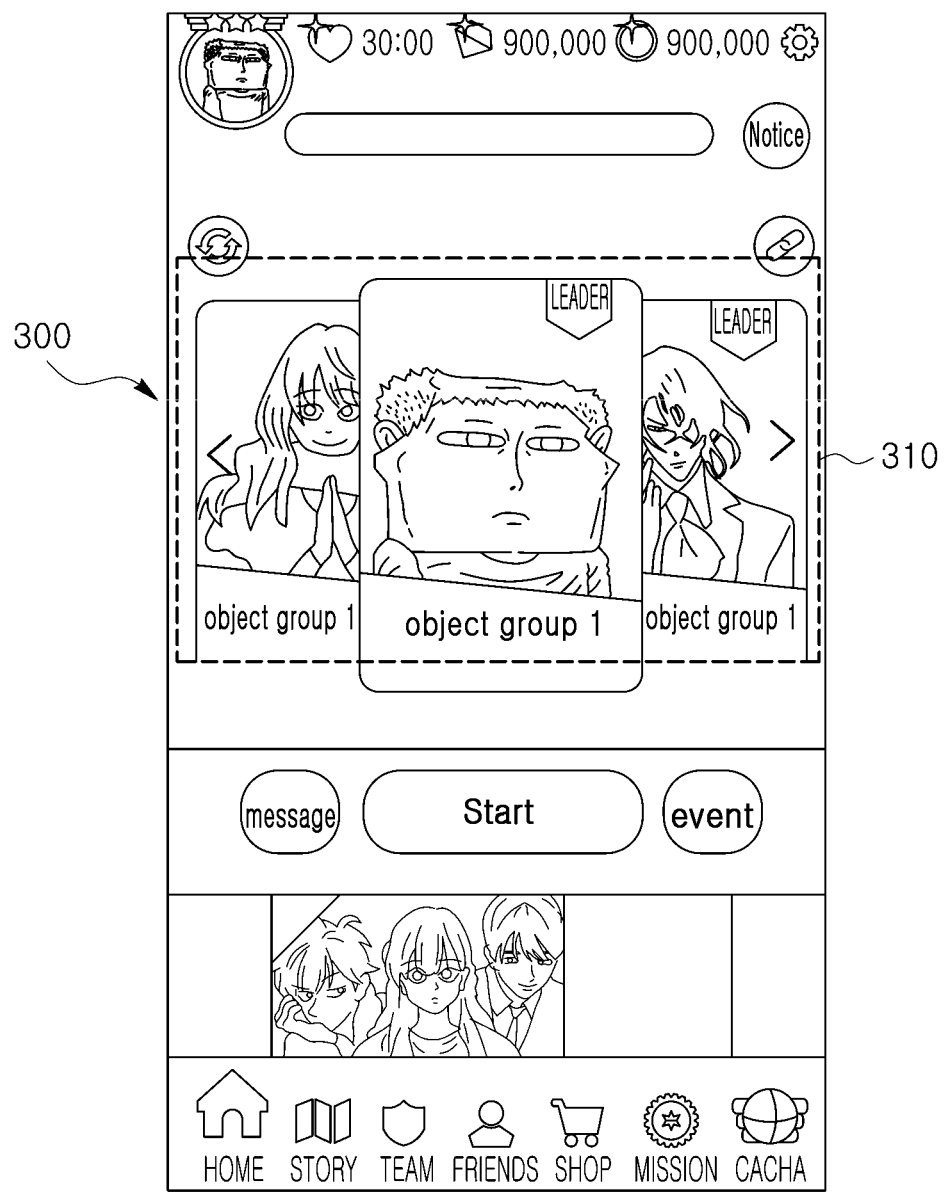
FIG. 4 is an exemplary embodiment of a screen illustrating a player object group in the method of FIG. 3.

FIG. 4 is an exemplary screen illustrating a player object group in the method of FIG. 3.

Referring to FIGS. 3 and 4, the user terminal 200 may configure a player object group 300 by user selecting a desired player object (S200). More specifically, the player object managing unit 130 may receive a user input information from the user terminal 200 and configure the player object group 300. At this time, the player object group 300 may include at least one player object 310 having a unique color. For example, the player object group 300 may be a character team that can include up to three game characters as shown in FIG. 4.

Meanwhile, when the user terminal 200 stores information on the player object group 300 configured in the previous game, the player object managing unit 130 may select the stored player object group 300 as it is, or may configure a new player object group 300 by changing at least some player objects of the stored player object group or adding new player objects to the stored player object group.

Figure 5:
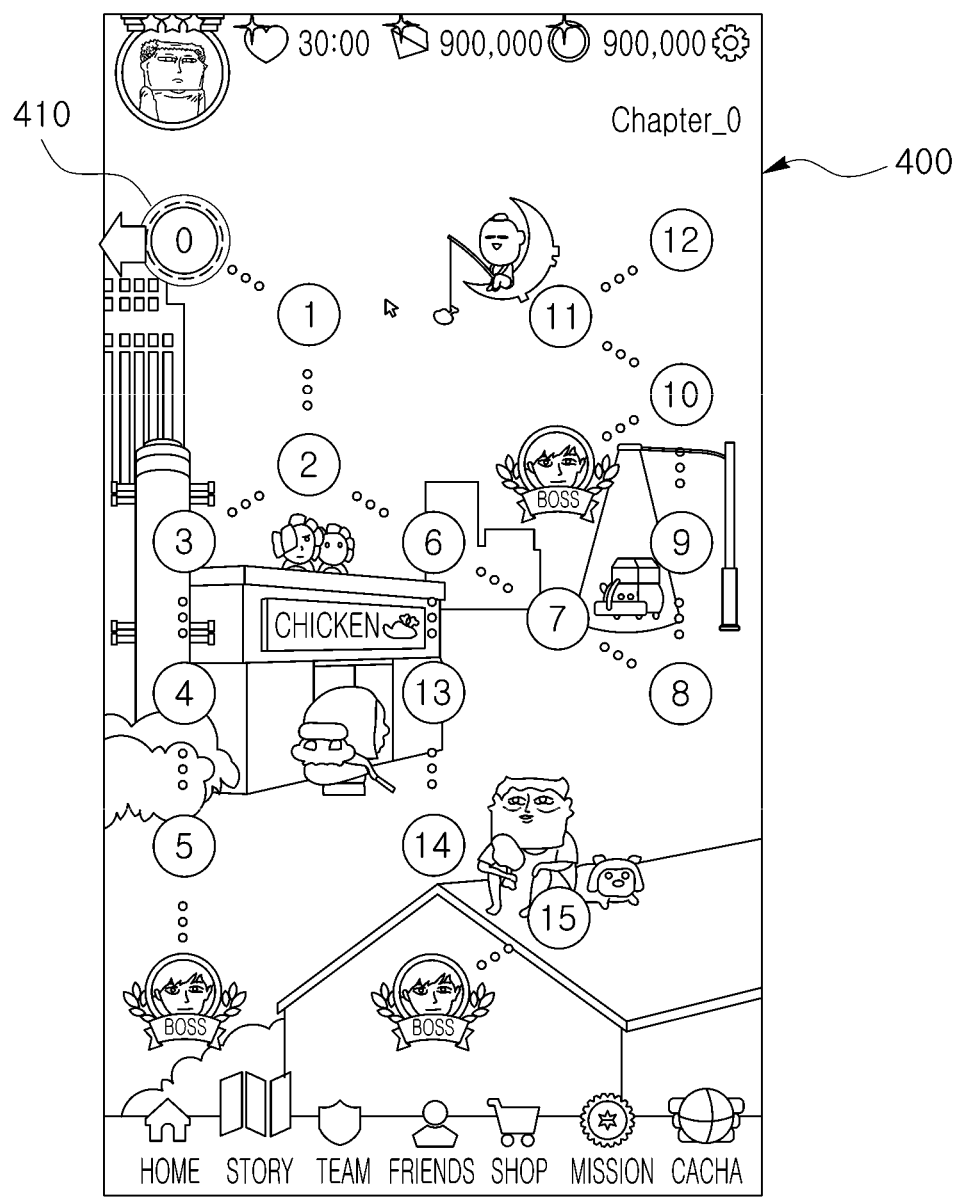
FIG. 5 is an exemplary embodiment of a screen for selecting a game stage in the method of FIG. 3 and entering the game stage.

FIG. 5 is an exemplary screen for selecting a game stage in the method of FIG. 3 and entering the game stage.

Referring to FIGS. 3 and 5, the user terminal 200 may receive user selection one of a plurality of chapters 400, each of which include a plurality of game stages 410. Also, the user terminal 200 may receive user selection of one of the plurality of game stages 410 included in the selected chapter 400. Then, the user terminal 200 transmit the user selection of game chapter 400 and game stage 410 to game server 100. That is, the game processing unit 120 receives a user input information related selection of game chapter and game stage from the user terminal 200 and determines, based on the received user input information, a game stage where the puzzle game will be played.

Figure 6:
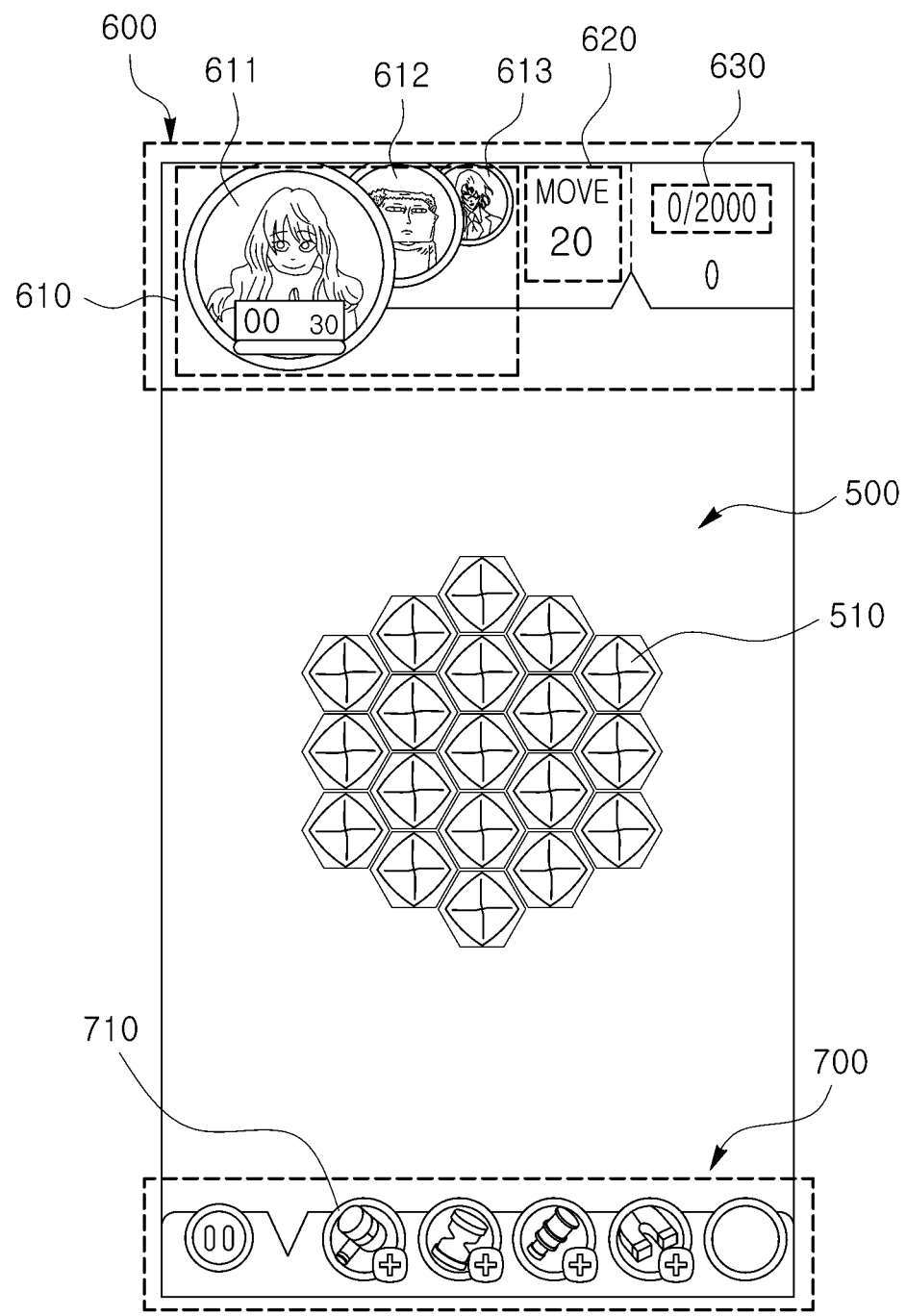
FIG. 6 is an exemplary embodiment of a screen displaying puzzle blocks in the method for providing a puzzle games of FIG. 3.

FIG. 6 is an exemplary screen displaying puzzle blocks in the method for providing a puzzle games of FIG. 3.

Referring to FIGS. 3 and 6, when the user terminal 200 enters the game stage selected in step S300, the game processing unit 120 transmits puzzle blocks 510, each of which has one of a plurality of colors, to the user terminal 200, and the user terminal 200 displays the received puzzle blocks 510 on the display unit (S400).

In the present embodiment, the display unit of the user terminal 200 may display a game screen including a play region 500 and a peripheral region 600, 700 other than the play region 500. The puzzle blocks 510 can be displayed in the play region 500, and the player object group 610, with player objects 611, 612, and 613, may be displayed in the peripheral region 600. The peripheral region 600, 700 may be disposed above or below the play region 500. The player object group 610 may be displayed at the upper end of the peripheral region 600, 700, and various special buttons 710 may be displayed at the lower end of the peripheral region to perform a special function in the game stage, for example. In addition, the peripheral region 600, 700 may include a score board 630 and a turn board 620. In the turn board 620, a number of remaining game turns by which, to the maximum, the user can be play the puzzle game in the selected games is shown. The details related to the number of remaining game turns will be described.

Figure 7:
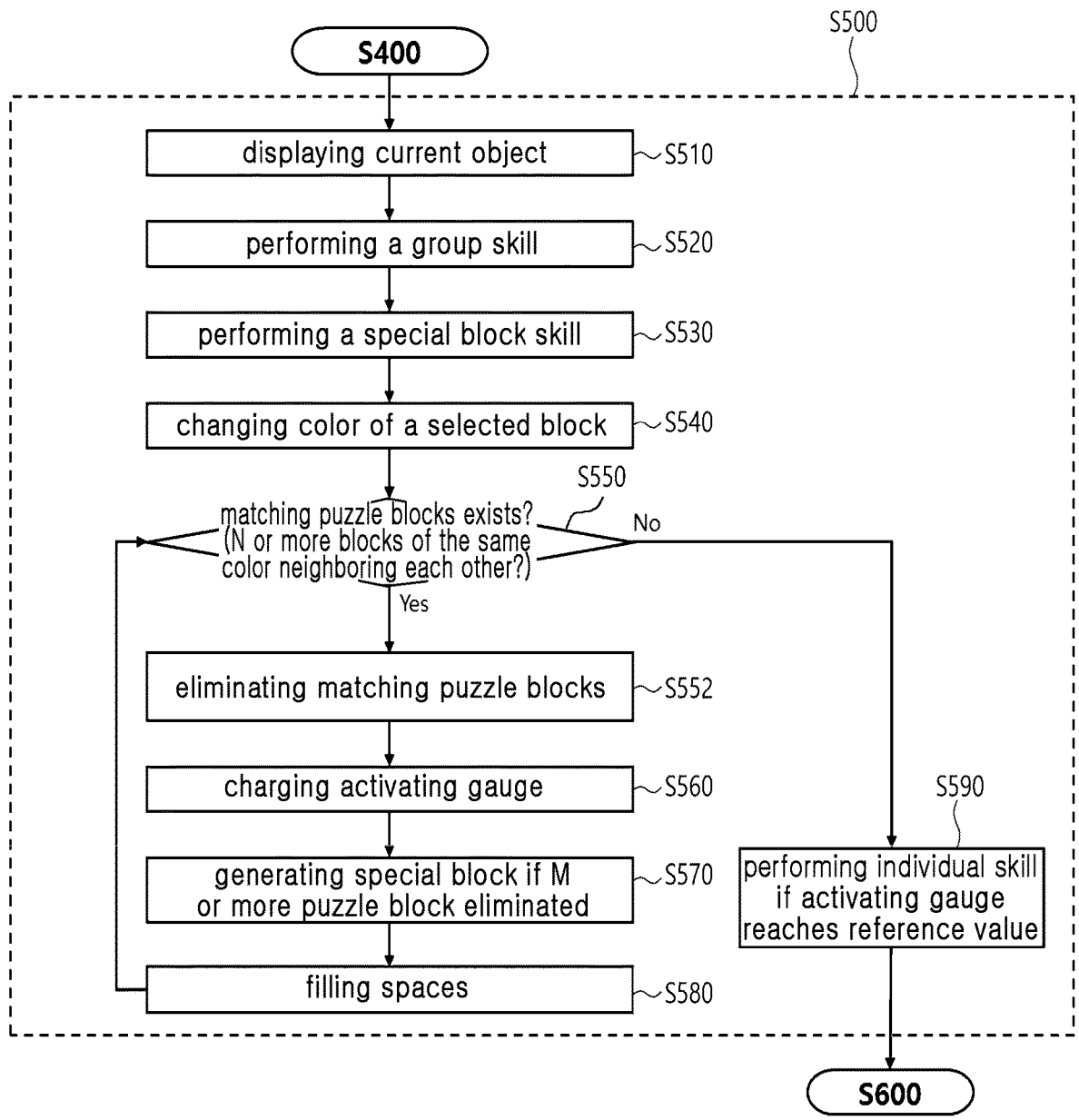
FIG. 7 is an exemplary embodiment of a flowchart illustrating a detailed process for performing a turn (S500) in the method of FIG. 3.

FIG. 7 is a flowchart illustrating a detailed process for performing a turn (S500) in the method of FIG. 3.

Referring to FIGS. 3 and 7, the game processing unit 120 may receive a user input information from the user terminal 200 and may perform a turn of the puzzle game in the game stage (S500). Hereinafter, it will be referred to as a 'one turn process (S500).

Specifically, the game processing unit 120 may display a player object applied to the current turn (hereinafter, referred to as a "current player object") in the peripheral region (S510). At this time, a player object 612 to be applied after the current turn of the player object group (hereinafter, referred to as "waiting player object") may be further displayed in the peripheral region.

In the present embodiment, the waiting player object may include a player object to be applied on the next turn of the current turn (hereinafter, referred to as a 'next player object') and a player object to be applied on the turn after the next turn (hereinafter, referred to as a 'post-next player object'). At this time, the current player object 611, the next player object 612, and the post-next player object 613 may be displayed in order in the peripheral region as shown in FIG. 6. In addition, the current player object 611 may be displayed bigger than the next player object 612 and the post-next player object 613.

In addition, each of the current player object 611, the next player object 612, and the post-next player object 613 may be randomly determined among a plurality of player objects included in the player object group 610. Therefore, the same player objects may be arranged in series. On the other hand, the current player object 611, the next player object 612, and the post-next player object 613 may be designated from the player objects included in the player object group in a predetermined order by user selection.

While each of the player objects included in the player object group has a color, it may have two or more colors depending in some cases. For example, when the user terminal 200 stores a special item, e.g., a prism card, the player objects included in the player object group may be changed to have two colors. Accordingly, when the number of player objects included in the player object group is three, the player object group can have six colors to the maximum. As described above, when the player object included in the player object group has two colors, the color of the player object displayed in the peripheral region may be selected randomly from the two colors.

Figure 8:
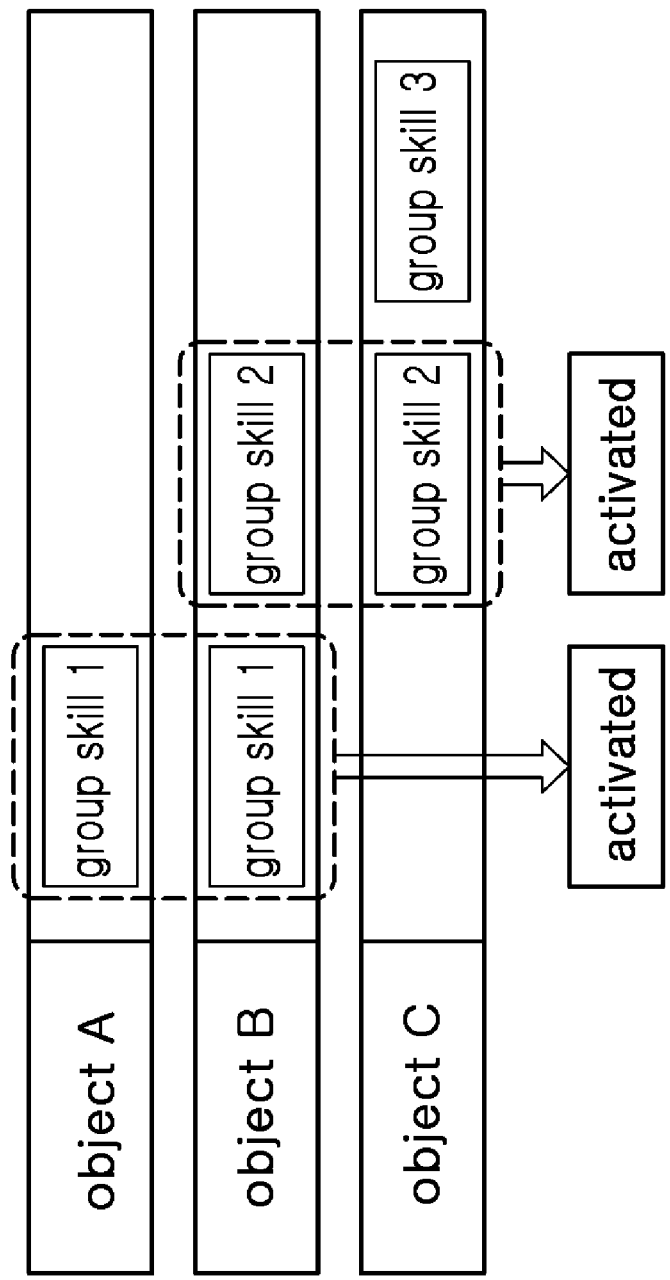
FIG. 8 is a conceptual diagram illustrating an exemplary embodiment of a process in which a group skill is performed during the process of FIG. 7.

FIG. 8 is a conceptual diagram illustrating an example of a process in which a group skill is performed during the process of FIG. 7.

Referring to FIGS. 7 and 8, when the two or more player objects among the plurality of player objects included in the player object group have the same group skill A, the game processing unit 120 performs the group skill A (S520). However, if a plurality of player objects included in the player object group do not have the same group skill, step S520 may be skipped.

For example, when the player object group is composed of a player object A, a player object B and a player object C, suppose that the player object A has a group skill 1, the player object B has a group skill 1 and a group skill 2, and C has group skill 2 and group skill 3. In this case, since the player object A and the player object B have the same group skill 1 and the player object B and the player object C have the same group skill 2, the group skill 1 and the group skill 2 can be activated and performed.

Referring back to FIG. 7, if a special block is included in the puzzle blocks displayed in the play region, the user terminal 200 selects a corresponding block to perform a corresponding skill of the special block (S530). However, when no special block is present in the play region, or when the special block is not selected even though a special block is present, the step S530 may be skipped without being performed.

Figure 9:
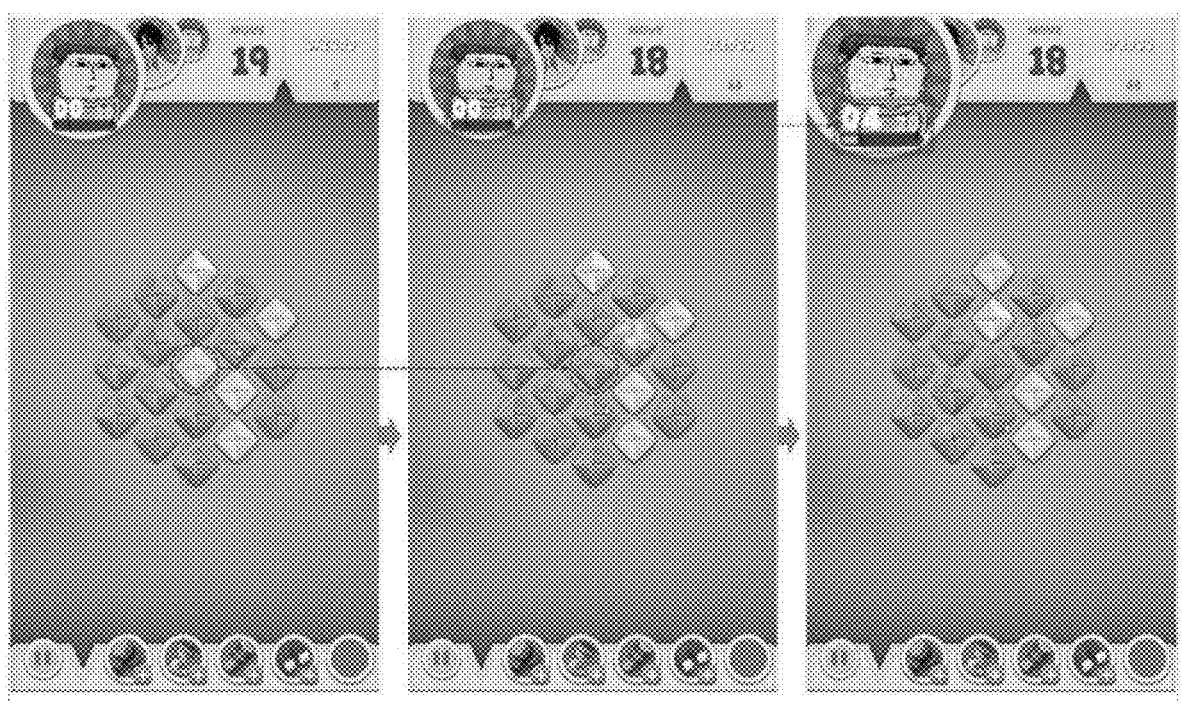
FIG. 9 is an exemplary embodiment of screens illustrating a process of changing the color of a puzzle block during the process of FIG. 7.

FIG. 9 is an exemplary screens illustrating a process of changing the color of a puzzle block during the process of FIG. 7.

Referring to FIGS. 7 and 9, the game processing unit 120 receives a user input information from the user terminal 200 to change color of one of the puzzle blocks displayed in the play region to the color of the current player object (S540). For example, as shown in FIG. 9, when the current player object has a blue color, when the user selects a yellow puzzle block by click or touch, the color of the selected puzzle block may be changed from yellow to blue.

After the color of the selected puzzle block is changed in step S540, the game processing unit 120 may determine whether equal to or more than N (N is a integer equal to or greater than 3) puzzle blocks neighboring each other that have the same color (hereinafter, such blocks are referred as "matching puzzle blocks") (S550). For example, the game processing unit 120 may determine whether four or more puzzle blocks adjacent to each other have the same color.

As a result of the determination in step S550, if it is determined that there are N or more puzzle blocks neighboring each other have the same color, the game processing unit 120 may eliminate the corresponding puzzle blocks (S552). At this time, if a special block is included in the puzzle blocks, i.e., matching buzzle blocks, to be eliminated, the skill of the special block can be performed together.

Then, according to the matching puzzle block elimination result in step S552, the activation gauge of the current player object may be charged (S560). That is, the activation gauge of the current player object may be charged in proportion to how many puzzle blocks having the color of the current player object are eliminated in step S552. For example, when the current player object is blue and four blue puzzle blocks are eliminated in the step S552, the activation gauge may be increased by four.

Figure 10:
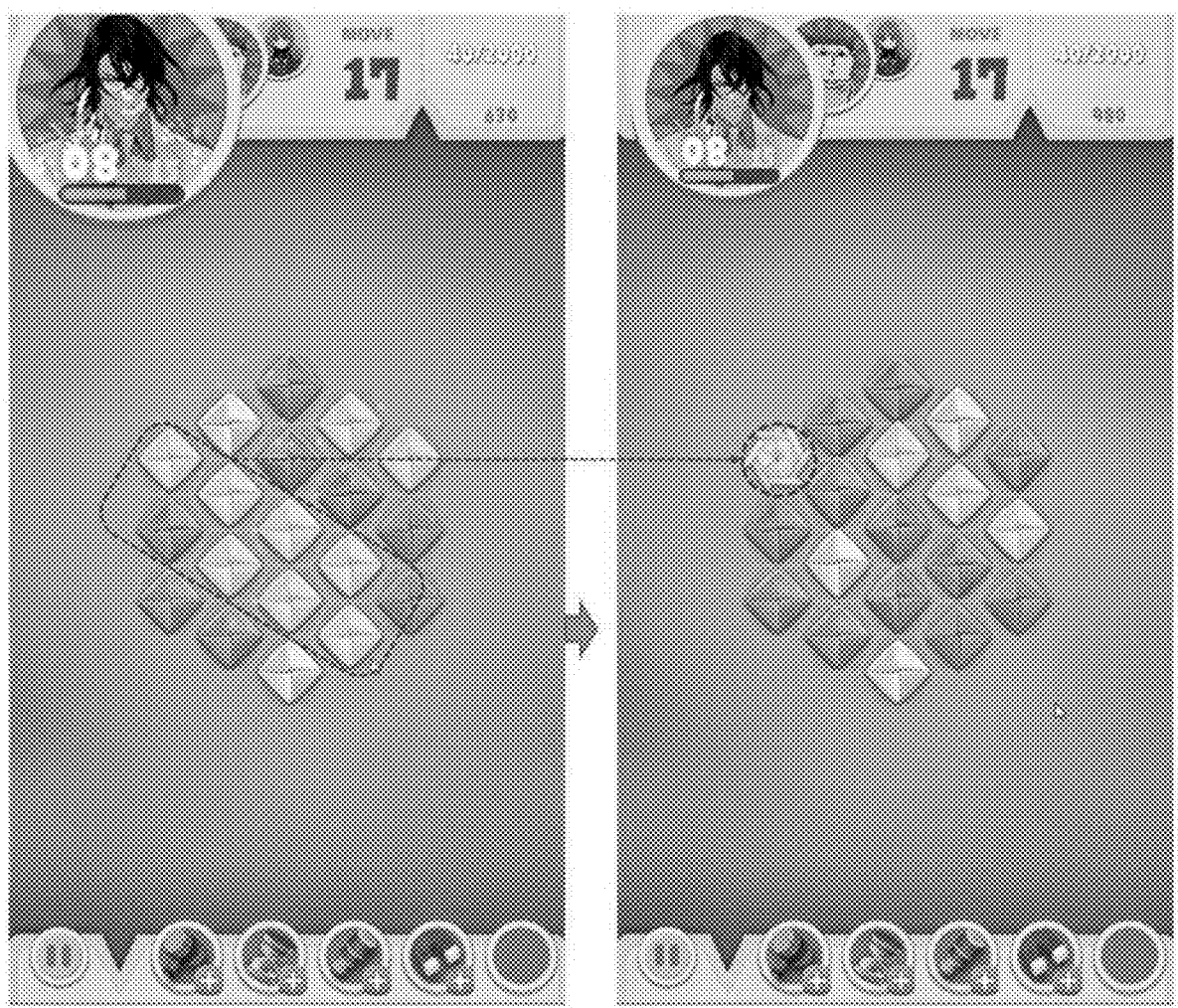
FIG. 10 is an exemplary embodiment of screens illustrating a process of generating a special block in the process of FIG. 7.

FIG. 10 is an exemplary screens illustrating a process of generating a special block in the process of FIG. 7.

Referring to FIG. 7 and FIG. 10, a new special block may be generated according to the puzzle block elimination result in step S552 (S570). For example, if the number of puzzle blocks eliminated in step S552 is greater than or equal to M (M is an integer greater than N), a new special block may be generated. At this time, the greater the number of puzzle blocks eliminated in step S552 is, the stronger skill the generated special block may have. For example, special blocks generated when the number of puzzle blocks eliminated is 6 to 7, 8 to 9, and 10 or more are different among others. Meanwhile, the special block can be generated in any one of the spaces where the puzzle blocks have been eliminated in the step S552, and then may be selectively used in the step S530 in the next turn.

Referring to FIG. 7 again, the game processing unit 120 may move the puzzle blocks from one side to another side, for example, from top to bottom, and fill the spaces where the matching puzzle blocks has been eliminated in step S552. (S580). At this time, the game processing unit 120 may generate a puzzle block having an arbitrary color to fill empty spaces of the top.

Thereafter, the steps S552 to S580 may be repeated until no more matching puzzle blocks are present in the play region.

Figure 11:
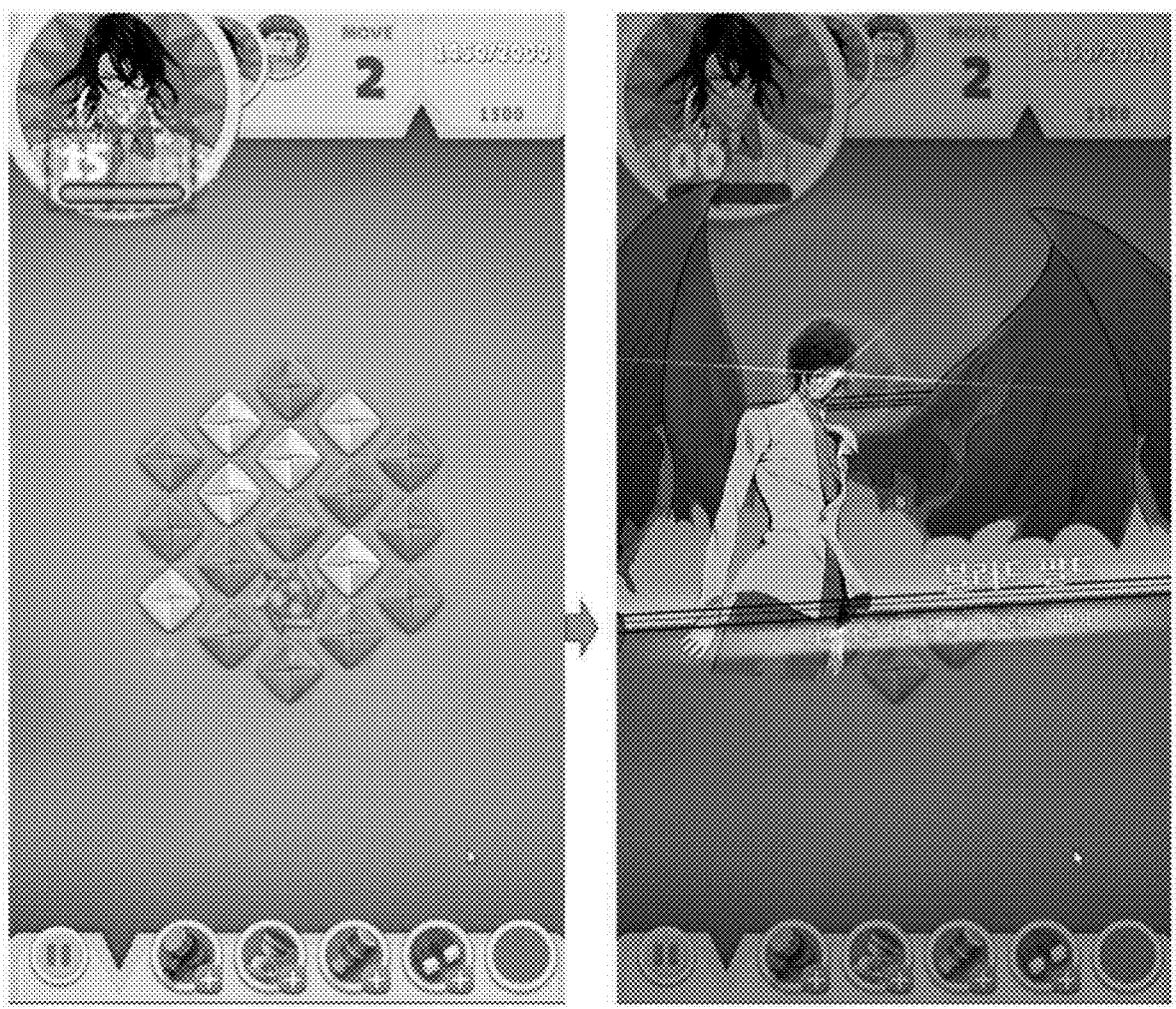
FIG. 11 is an exemplary embodiment of screens illustrating a process of performing a individual skill during the process of FIG. 7.

FIG. 11 is exemplary screens illustrating a process of performing a individual skill during the process of FIG. 7.

Referring to FIGS. 7 and 11, if it is determined in step S550 that there are no more matching puzzle blocks that exist, the game processing unit 120 determines whether the activation gauge of the current player object has reached a reference value. Then, if it is determined that the activation gauge of the current player object has reached the reference value, the individual skill of the current player object may be performed (S590).

Meanwhile, the skills of the present embodiment, i.e., the skill of the special block, the group skill and the individual skill, may perform various functions when they are activated. For example, the function of a skill may be one of eliminating puzzle blocks of a predetermined color, eliminating blocks in a certain region, or changing a color of blocks to any other color. If matching puzzle blocks become present after the skill performs the corresponding function, the game processing unit 120 may perform the steps S552 to S580 may be sequentially. At this time, the step S560 may be skipped.

The function of a skill may include acquiring an item or a certain amount of game money, or charging the activation gauge of a player object in the player object group.

Referring back to FIG. 3, after performing step S500, the game processing unit 120 may determine whether or not the cumulative score has reached a target score for clearing the game stage (S600).

If it is determined in step S600 that the acquired score in the game stage has reached the target score, the game processing unit 120 may provide the user terminal 200 with a message indicating that the game stage has been cleared (S610).

Also, the game processing unit 120 may provide the user terminal 200 with a compensation for clearing the game stage or the acquired score in the game stage (S620). At this time, the compensation provided in the step S620 may include game money, items, and the like. Then, the game processing unit 120 may repeat the step S200 and steps thereafter in response to user selection.

On the other hand, if it is determined in step S600 that the acquired score in the game stage has not reached the target score, the game processing unit 120 decreases the number of remaining game turns in the game stage by one (S700).

Next, the game processing unit 120 may determine whether the number of remaining game turns in the game stage is zero (S710).

If it is determined in step S710 that the number of remaining game turns in the game stage is zero, the game processing unit 120 may transmit a message indicating a failure of clearing the game stage to the user terminal 200 (S720). Then, the game processing unit 120 may repeat the step S200 and steps thereafter in response to user selection.

On the other hand, if it is determined in step S710 that the number of game progress turns in the game stage is not zero, the game processing unit 120 may repeatedly perform the step S500 and steps thereafter.

As described above, according to the present embodiment, as the current player object is determined from a player object group configured before the puzzle game is started, the color of a puzzle block selected by the user input through the user terminal 200 may be changed to the color of the current player object. Then, if, among the puzzle blocks displayed in the user terminal 200, N or more puzzle blocks adjacent to each other have the same color, the puzzle blocks may be eliminated. That is, the user can feel the fun of changing the color of an arbitrary puzzle block to the color of the current player object.

Further, when the activation gauge of the current player object is filled according to result of puzzle block elimination and reaches a reference value, an individual skill of the current player object can be performed. In addition, when two or more player objects of a player object group have the same group skill A, the group skill A is performed so that the user can feel the fun of the puzzle game more.

Also, since at least one waiting player object is displayed together with the current player object, the user can preview the player object to be applied next to prepare for the next turn in advance.

The above-described method descriptions and the process flow diagrams are provided as illustrative examples and are not intended to require or imply that the steps of the various exemplary embodiments must be performed in the order presented. Instead, the order of steps in the foregoing exemplary embodiments may be performed in any order. Words such as "after", "then," "next," etc. are merely intended to aid the reader through description of the methods.

The various illustrative logical blocks, units, modules, circuits, and algorithm steps described in connection with the exemplary embodiments may be implemented as electronic hardware, computer software, or combinations of both. In order to describe the interchangeability of hardware and software, various illustrative features, blocks, units, modules, circuits, and steps have been described above in terms of their general functionality. Whether such functionality is implemented as hardware or software depends upon the particular application and design constraints for the overall system. A person of ordinary skill in the art may implement the functionality in various ways for each particular application without departing from the scope of the present invention.

The hardware such as the server 100 and the terminal 200 used to implement the various illustrative logics, logical blocks, units, modules, and circuits described in connection with the exemplary embodiments disclosed herein may be implemented or performed with a general purpose processor, a digital signal processor (DSP) an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory processor-readable storage medium or a non-transitory computer-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disc includes optically reproducible data such as a compact disc (CD), laser disc, optical disc, digital versatile disc (DVD), and blu-ray disc. Disk includes magnetically reproducible data such as a floppy disk. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. A method for providing a puzzle game performed by a user terminal connected to a game server via a network and including a display unit displaying an image, the method comprising steps of:
   a) configuring a player object group comprising a character team of game characters as a plurality of player objects, a first of the player objects having a first unique color, a second of the player objects having a second unique color different from the first unique color; and
   b) performing a plurality of turns of the puzzle game, wherein in the step of performing the plurality of turns of the puzzle game, each turn comprises:
   b1) determining, per each turn, a single player object from the player object group as a current player object so that one of the plurality of player objects is respectively provided as the current player object for the plurality of turns making up the puzzle game;
   b2) displaying the current player object to be applied to a current turn from the player object group, in which the current player object and at least one waiting player object is displayed in a peripheral region of the display unit along with the at least one waiting player object to be applied in a turn after the current turn, and in which the current player object is displayed as being superimposed over a portion of the at least one waiting player object;
   b3) displaying a set of puzzle blocks comprising predetermined colors;
   b4) receiving a user selection of one of the displayed puzzle blocks;
   b5) changing a first color of the selected block to a unique color corresponding to the current player object;
   b6) determining whether a number of puzzle blocks that are adjacent to each other equal to or more than N, where N is an integer equal to or greater than 3, have the same color so as to comprise matching puzzle blocks; and
   b7) eliminating the matching puzzle blocks, and
   c) repeating steps b1) through b7) for each of the plurality of turns to be performed,
   wherein the puzzle blocks in the game stage are displayed in a play region of the display unit, and
   the current player object is displayed in the peripheral region of the display unit that is located above or below the play region of the display unit.

2. The method of claim 1,
   wherein the step of performing a turn of the puzzle game further comprises steps of:
   moving puzzle blocks remaining after eliminating the matching puzzle blocks from one side to another side to fill spaces where the matching puzzle blocks have been eliminated; and
   repeating the steps of determining, eliminating, and moving until it is determined no more matching puzzle blocks exist.

3. The method of claim 1,
   wherein the step of performing a turn of the puzzle game further comprises steps of:
   charging an activation gauge of the current player object according to a result of eliminating the matching puzzle block; and
   performing an individual skill of the current player object when the activation gauge of the current player object reaches a reference value.

4. The method of claim 1,
   wherein the step of performing a turn of the puzzle game further comprises a step of performing a group skill when two or more player objects among the plurality of player objects included in the player object group have the same group skill.

5. The method of claim 1, further comprises performing the step of displaying the puzzle blocks in response to a user input of entering a game stage,
   wherein the turn of the puzzle game is performed in the game stage.

6. The method of claim 5, further comprising steps of:
   decrementing number of remaining turns in the game stage after performing the turn of the puzzle game; and
   performing the turn of the game until the number of remaining turns in the game stage becomes zero.

7. The method of claim 5, further comprising a step of repeating the step of performing a turn until an acquired score in the game stage reaches a target score.

8. The method of claim 1,
   wherein the current player object is randomly determined among the plurality of player objects included in the player object group.

9. The method of claim 1,
   wherein the waiting player object is randomly determined among the plurality of player objects included in the player object group.

10. The method of claim 1,
    wherein the waiting player object comprises a next player object that is to be applied to a next turn of the current turn and a post-next player object that is to be applied to a turn after the next turn.

11. The method of claim 10, wherein the current player object, the next player object, and the post-next player object are displayed in the peripheral region in order of decreasing size.

12. The method of claim 1,
    wherein the step of performing a turn of the puzzle game further comprise a step of
    generating a special block in one of the spaces where the matching puzzle blocks have been eliminated when a number of puzzle blocks eliminated is equal to or greater than M, where M is an integer larger than N, and increasing the plurality of turns of the puzzle game by at least one.

13. The method of claim 12, further comprising a step of performing a special skill of the special block when the special block is selected by a user input or when the special block is included in the matching puzzle block in the step of performing of a turn of the puzzle game.

14. A method for providing a puzzle game performed by a game server connected via a network to a user terminal including a display unit displaying an image, the method comprising steps of:

15 a) configuring a player object group comprising a character team of game characters as a plurality of player objects, a first of the player objects having a first unique color, a second of the player objects having a second unique color different from the first unique color; and
b) performing a plurality of turns of the puzzle game,
wherein in the step of performing the plurality of turns of the puzzle game, each turn comprises:
b1) determining, per each turn, a single player object from the player object group as a current player object so that one of the plurality of player objects is respectively provided as the current player object for the plurality of turns making up the puzzle game;
b2) displaying the current player object to be applied to a current turn from the player object group, in which the current player object and at least one waiting player object is displayed in a peripheral region of the display unit along with the at least one waiting player object to be applied in a turn after the current turn, and in which the current player object is displayed as being superimposed over a portion of the at least one waiting player object;
b3) displaying a set of puzzle blocks comprising predetermined colors;
b4) receiving a user selection of one of the displayed puzzle blocks;
b5) changing a displayed first color of the selected puzzle block to a second color corresponding to the current player object;
b6) determining whether a number of puzzle blocks that are adjacent to each other equal to or more than N, where N is an integer equal to or greater than 3, have the same color so as to comprise matching puzzle blocks; and
b7) eliminating the matching puzzle blocks, and
c) repeating steps b1) through b7) for each of the plurality of turns to be performed.

15. The method of claim 14,
wherein the step of performing a turn of the puzzle game further comprise steps of:
moving puzzle blocks remaining after eliminating the matching puzzle blocks from one side to another side to fill spaces where the matching puzzle blocks have been eliminated; and
repeating the steps of determining, eliminating, and moving until it is determined no more matching puzzle blocks exist.

16. The method of claim 14,
wherein the step of performing a turn of the puzzle game further comprise steps of:
charging an activation gauge of the current player object according to a result of eliminating the matching puzzle block; and
performing an individual skill of the current player object when the activation gauge of the current player object reaches a reference value.

17. The method of claim 14,
wherein the step of performing a turn of the puzzle game further comprise a step of performing a group skill when two or more player objects among the plurality of player objects included in the player object group have the same group skill.

18. The method of claim 14, further comprising a step of:
performing the step of displaying the puzzle blocks in response to a user input of entering a game stage,
wherein the turn of the puzzle game is performed in the game stage.

19. The method of claim 18, further comprising steps of:
decrementing number of remaining turns in the game stage after performing the turn of the puzzle game; and
performing the turn of the game until the number of remaining turns in the game stage becomes zero.

20. The method of claim 18, further comprising a step of repeating the step of performing a turn until an acquired score in the game stage reaches a target score.

21. The method of claim 14,
wherein the current player object is randomly determined among the plurality of player objects included in the player object group.

22. The method of claim 14,
wherein, in the step of displaying the current player object, at least one waiting player object which is to be applied in a turn after current turn is displayed in the peripheral region in order of decreasing size.

23. The method of claim 22,
wherein the waiting player object is randomly determined among the plurality of player objects included in the player object group.

24. The method of claim 22,
wherein the waiting player object comprises a next player object that is to be applied to a next turn of the current turn and a post-next player object that is to be applied to a turn after the next turn.

25. The method of claim 24, wherein the current player object, the next player object, and the post-next player object are displayed in the peripheral region in order of decreasing size.

26. The method of claim 14,
wherein the step of performing a turn of the puzzle game further comprise a step of generating a special block in one of the spaces where the matching puzzle blocks have been eliminated when a number of puzzle blocks eliminated is equal to or greater than M, where M is an integer larger than N.

27. The method of claim 26, further comprising a step of performing a special skill of the special block when the special block is selected by a user input or the special block is included in the matching puzzle block in the step of performing of a turn of the puzzle game.

28. A game server comprising:
a memory for storing executable instructions; and
a processor configured with the executable instructions to provide:
a main control unit receiving login information from a user terminal connected via a network to perform a login process;
a game processing unit allowing the user terminal to execute the puzzle game in response to receiving a request for puzzle game from the user terminal; and
a player object managing unit configuring a player object group comprising a character team of game characters as a plurality of player objects, each of the player objects having a unique color,
wherein the game processing unit performs a process for a turn of the puzzle game that comprises a plurality of turns, each of the turns comprising:
b1) determining, per each turn, a single player object from the player object group as a current player object so that one of the plurality of player objects is respectively provided as the current player object for the plurality of turns making up the puzzle game;
b2) displaying the current player object to be applied to a current turn from the player object group, in which the current player object and at least one waiting player object is displayed in a peripheral region of the display unit along with the at least one waiting player object to be applied in a turn after the current turn, and in which the current player object is displayed as being superimposed over a portion of the at least one waiting player object;

b3) displaying a set of puzzle blocks comprising predetermined colors;

b4) receiving a user selection of one of the displayed puzzle blocks;

b5) changing a displayed first color of the selected block to a unique color corresponding to the current player object;

b6) determining whether a number of puzzle blocks that are adjacent to each other equal to or more than N, where N is an integer equal to or greater than 3, have the same color so as to comprise matching puzzle blocks; and b7) eliminating the matching puzzle blocks, and c) repeating steps b1) through b7) for each of the plurality of turns to be performed, wherein the game processing unit further performs the step of displaying the puzzle blocks in response to a user input of entering a game stage, wherein the turn of the puzzle game is performed in the game stage, and wherein the puzzle blocks in the game stage are displayed in a play region of the display unit, and the current player object is displayed in the peripheral region of the display unit that is above or below the play region on a top or bottom portion of the display unit.

29. The game server of claim 28,
wherein the step of performing a turn of the puzzle game further comprises steps of:
moving puzzle blocks remaining after eliminating the matching puzzle blocks from one side to another side to fill spaces where the matching puzzle blocks have been eliminated; and
repeating the steps of determining, eliminating, and moving until it is determined no more matching puzzle blocks exists.

30. The game server of claim 28,
wherein the process for a turn further comprises steps of:
charging an activation gauge of the current player object according to a result of eliminating the matching puzzle block; and
performing an individual skill of the current player object when the activation gauge of the current player object reaches a reference value.

31. The game server of claim 28,
wherein the step of performing a turn of the puzzle game further comprising a step of performing a group skill when two or more player objects among the plurality of player objects included in the player object group have the same group skill.

32. The game server of claim 28,
wherein the current player object is randomly determined among the plurality of player objects included in the player object group.

33. The game server of claim 28,
wherein the waiting player object is randomly determined among the plurality of player objects included in the player object group.

34. The game server of claim 28,
wherein the waiting player object comprises a next player object that is to be applied to a next turn of the current turn and a post-next player object that is to be applied to a turn after the next turn.

35. The game server of claim 34,
wherein the current player object, the next player object, and the post-next player object are displayed in the peripheral region in order.

36. The game server of claim 28,
wherein the game processing unit further performs steps of:
decrementing number of remaining turns in the game stage after performing the turn of the puzzle game; and
performing the turn of the game until the number of remaining turns in the game stage becomes zero.

37. The game server of claim 28,
wherein the game processing unit further performs a step of repeating the step of performing a turn until an acquired score in the game stage reaches a target score.

38. The game server of claim 28,
wherein the process for a turn of the puzzle game further comprises a step of generating a special block in one of the spaces where the matching puzzle blocks have been eliminated when a number of puzzle blocks eliminated is equal to or greater than M, where M is an integer larger than N, and increasing the plurality of turns of the puzzle game by at least one.

39. The game server of claim 38,
wherein the process for a turn of the puzzle game further comprises a step of performing a special skill of the special block when the special block is selected by a user input or the special block is included in the matching puzzle block in the step of performing of a turn of the puzzle game, and wherein the special skill comprises increasing the plurality of turns of the puzzle game by at least one.

* * * * *